US012641152B2

(12) United States Patent
Bangolae et al.

(10) Patent No.: US 12,641,152 B2
(45) Date of Patent: May 26, 2026

(54) REMOTE DIRECT MEMORY ACCESS (RDMA) SUPPORT IN CELLULAR NETWORKS

(71) Applicant: Intel Corporation, Santa Clara, CA (US)

(72) Inventors: Sangeetha L. Bangolae, Santa Clara, CA (US); Zongrui Ding, Portland, OR (US); Qian Li, Portland, OR (US); Sudeep Palat, Gloucestershire (GB); Youn Hyoung Heo, Santa Clara, CA (US); Alexandre Saso Stojanovski, Paris (FR); Thomas Luetzenkirchen, Taufkirchen (DE); Ching-Yu Liao, Santa Clara, CA (US); Abhijeet Kolekar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 18/558,713

(22) PCT Filed: Aug. 10, 2022

(86) PCT No.: PCT/US2022/039929
    § 371 (c)(1),
    (2) Date: Nov. 2, 2023

(87) PCT Pub. No.: WO2023/018779
    PCT Pub. Date: Feb. 16, 2023

(65) Prior Publication Data
    US 2024/0236183 A1     Jul. 11, 2024

Related U.S. Application Data

(60) Provisional application No. 63/233,160, filed on Aug. 13, 2021.

(51) Int. Cl.
    *H04L 67/1097*     (2022.01)
    *H04W 4/029*       (2018.01)
    *H04W 28/02*       (2009.01)

(52) U.S. Cl.
    CPC ......... *H04L 67/1097* (2013.01); *H04W 4/029* (2018.02); *H04W 28/0263* (2013.01); *H04W 28/0268* (2013.01); *H04W 28/0284* (2013.01)

(58) Field of Classification Search
    CPC .......... H04L 67/1097; H04W 28/0263; H04W 28/0284; H04W 4/029; H04W 28/0268
    See application file for complete search history.

(56) References Cited

U.S. PATENT DOCUMENTS

2016/0026604 A1 *   1/2016   Pandit .................... G06F 15/17
                                                        709/212
2017/0171075 A1 *   6/2017   Sajeepa ................. H04L 69/324
                             (Continued)

FOREIGN PATENT DOCUMENTS

CN          108631947       * 10/2018
CN          108631947 A       10/2018
                             (Continued)

OTHER PUBLICATIONS

3GPP, "Technical Specification Group Radio Access Network; NR; Medium Access Control (MAC) protocol specification (Release 16)," 3GPP TS 38.321 V16.5.0 (Jun. 2021), 5G, 157 pages.
                             (Continued)

*Primary Examiner* — Tonia L Dollinger
(74) *Attorney, Agent, or Firm* — Gray Ice Higdon, PLLC

(57)                   ABSTRACT
Various embodiments herein are directed to remote direct memory access (RDMA) support in cellular networks. In particular, some embodiments may relate to enhancements to RDMA over cellular network (RoCN) protocols.

16 Claims, 14 Drawing Sheets

1200

Retrieving, from a memory, configuration information associated with offloading a computing task from a user equipment (UE) using remote direct memory access (RDMA) over cellular network (RoCN), wherein the configuration information includes an RDMA or RoCN indicator
1205

Generating, based on the configuration information, a plurality of queue pairs (QPs), each respective QP having a respective QP identifier (ID)
1210

Mapping RoCN traffic among a plurality of logical channels based on the plurality of QPs
1215

(56) References Cited

U.S. PATENT DOCUMENTS

| | | | |
|---|---|---|---|
| 2019/0354406 A1 | 11/2019 | Ganguli et al. | |
| 2019/0354506 A1* | 11/2019 | Bruner | G06F 15/17331 |
| 2020/0137594 A1* | 4/2020 | Notargiacomo | H04W 36/06 |
| 2021/0117370 A1* | 4/2021 | Zhu | G06F 9/45558 |
| 2022/0114234 A1 | 4/2022 | George et al. | |

FOREIGN PATENT DOCUMENTS

| | | | |
|---|---|---|---|
| WO | 2022/026081 A1 | 2/2022 | |
| WO | 2022/031553 A1 | 2/2022 | |
| WO | 2022/170214 A1 | 8/2022 | |

OTHER PUBLICATIONS

3GPP, "Technical Specification Group Radio Access Network; NR; NR and NG-RAN Overall Description; Stage 2 (Release 16)," 3GPP TS 38.300 V16.6.0 (Jun. 2021), 5G, 152 pages.

3GPP, "Technical Specification Group Services and System Aspects; System architecture for the 5G System (5GS); Stage 2 (Release 17)," 3GPP TS 23.501 V17.1.1 (Jun. 2021), 5G, 526 pages.

3GPP, "Technical Specification Group Services and System Aspects; Study on Enhancements to the Service-Based Architecture (Release 16)," 3GPP TR 23.742 V16.0.0 (Dec. 2018-12), 5G, 131 pages.

3GPP, "Technical Specification Group Radio Access Network; NG-RAN; Architecture description (Release 16)," 3GPP TS 38.401 V16.6.0 (Jul. 2021), 5G, 79 pages.

Zhu, et al., "Congestion Control for Large-Scale RDMA Deployments," ACM SIGCOMM Computer Communication Review, SIGCOMM '15, Aug. 17-21, 2015, London, United Kingdom, Aug. 17, 2015, ACM. ISBN 978-1-4503-3542-Mar. 15, 2008, DOI: http://dx.doi.rg/10.1145/2785956.2787484, pp. 523-536.

Mellanox Technologies, "RoCE vs. iWARP Competitive Analysis," White Paper, Feb. 2017, 6 pages.

Brdar, et al., "Big Data Processing, Analysis and Applications in Mobile Cellular Networks", Part of the Lecture Notes in Computer Science book series, cHiPSet, (LNCS, vol. 11400), 2019, pp. 163-185.

Kumar, et al., "Swift: Delay is Simple and Effective for Congestion Control in the Datacenter," SIGCOMM '20: Proceedings of the Annual conference of the ACM Special Interest Group on Data Communication on the applications, technologies, architectures, and protocols for computer communication, https://doi.org/10.1145/3387514.3406591, Jul. 2020, pp. 514-528.

3GPP, "Technical Specification Group Services and System Aspects; IP Multimedia Subsystem (IMS); Multimedia Telephony; Media handling and interaction (Release 17)," 3GPP TS 26.114 V17.1.0 (Jun. 2021), 5G, 471 pages.

3GPP, "Technical Specification Group Core Network and Terminals; 5G System; Unified Data Management Services; Stage 3 (Release 17)," 3GPP TS 29.503 V17.3.0 (Jun. 2021), 5G, 403 pages.

3GPP, "Technical Specification Group Services and System Aspects; Procedures for the 5G System (5GS); Stage 2 (Release 17)," 3GPP TS 23.502 V17.1.0 (Jun. 2021), 5G, 692 pages.

3GPP, "Technical Specification Group Core Network and Terminals; Non-Access-Stratum (NAS) protocol for 5G System (5GS); Stage 3; (Release 17)," 3GPP TS 24.501 V17.3.1 (Jun. 2021), 5G, 825 pages.

Caulfield, et al., "A Cloud-Scale Acceleration Architecture," Microsoft corporation, 2016 49th Annual IEEE/ACM International Symposium on Microarchitecture (MICRO), Oct. 15-19, 2016 Taipei, Taiwan, 13 pages.

International Patent Office—International Search Report and Written Opinion mailed Nov. 24, 2022, from International Patent Application No. PCT/US2022/039929, 11 pages.

* cited by examiner

| RDMA App |
| RoCN Trans. |
| RoCN control / Network Layer |
| L2 |
| L1 |

Comp SF/DSF

| RoCN control | SDAP/PDCP |
| Network Layer | RLC |
| L2 | RoCN aware MAC |
| L1 | RoCN aware PHY | xNB

| RDMA App |
| RoCN Trans. |
| SDAP/PDCP |
| RLC |
| RoCN aware MAC |
| RoCN aware PHY |

| UE |
|---|
| RDMA App |
| RoCN Trans. |
| SDAP/PDCP |
| RLC |
| RoCN aware MAC |
| RoCN aware PHY |

| xNB |
|---|
| RDMA App |
| RoCN Trans. |
| SDAP/PDCP |
| RLC |
| RoCN aware MAC |
| RoCN aware PHY |

Figure 4

1200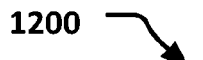

Retrieving, from a memory, configuration information associated with offloading a computing task from a user equipment (UE) using remote direct memory access (RDMA) over cellular network (RoCN), wherein the configuration information includes an RDMA or RoCN indicator
1205

Generating, based on the configuration information, a plurality of queue pairs (QPs), each respective QP having a respective QP identifier (ID)
1210

Mapping RoCN traffic among a plurality of logical channels based on the plurality of QPs
1215

Figure 12

1300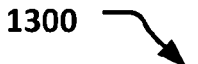

Receiving, from a user equipment (UE), a radio resource control (RRC) setup request that includes configuration information associated with offloading a computing task from the UE using remote direct memory access (RDMA) over cellular network (RoCN), wherein the configuration information includes an RDMA or RoCN indicator
1305

Generating, based on the configuration information, a plurality of queue pairs (QPs), each respective QP having a respective QP identifier (ID)
1310

Mapping RoCN traffic among a plurality of logical channels based on the plurality of QPs
1315

Figure 13

1400

Receiving, from a next-generation NodeB (gNB), system information to indicate support of RoCN as a capability by the gNB
1405

Encoding, for transmission to the gNB, a radio resource control (RRC) setup request that includes configuration information associated with offloading a computing task from the UE using remote direct memory access (RDMA) over cellular network (RoCN), wherein the configuration information includes an RDMA or RoCN indicator
1410

Figure 14

REMOTE DIRECT MEMORY ACCESS (RDMA) SUPPORT IN CELLULAR NETWORKS

CROSS REFERENCE TO RELATED APPLICATION

The present application is a national phase entry under 35 U.S.C. § 371 of International Application No. PCT/US2022/039929, filed Aug. 10, 2022, entitled "REMOTE DIRECT MEMORY ACCESS (RDMA) SUPPORT IN CELLULAR NETWORKS," which claims priority to U.S. Provisional Patent Application No. 63/233,160, which was filed Aug. 13, 2021, the entire disclosures of which are hereby incorporated by reference.

FIELD

Various embodiments generally may relate to the field of wireless communications. For example, some embodiments may relate to remote direct memory access (RDMA) support in cellular networks. In particular, some embodiments may relate to enhancements to RDMA over cellular network (RoCN) protocols.

BACKGROUND

Modern cloud computing has become extremely popular to provide computing/storage capability to customers who can focus more on the SW development and data management without worrying too much about the underlying infrastructure. Edge computing is believed to extend this capability close to the customers to optimize performance metrics such as latency. The 5G architecture design take these scenarios into considerations and developed multi-homing, uplink classifier (ULCL) framework to offload compute tasks to different data networks (DNS), which may be at the network edge. For the user equipment (UE) with limited computing capabilities, the application can be rendered at the cloud/edge for computing offloading based on application level logic above OS.

With the trend of Telco network cloudification, the cellular network is foreseen to be built with flexibility and scalability by virtualized network functions (VNFs) or containerized network functions (CNFs) running on general purpose hardware. Heterogeneous computing capabilities provided by hardware and software, naturally coming with this trend, can be leveraged to provide augmented computing to end devices across device and network. These computing tasks generally have different requirements in resource and dependencies in different scenarios. For example, a computing task can include an application instance, either standalone or serving one or more UEs. A computing task can also include a generic function like artificial intelligence (AI) training or inference or a microservice function using specific accelerators. In addition, the computing task can be semi-static or dynamically launched. Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 illustrates an example of a RoCN-aware MAC that is end to end between a UE and xNB for solution 1, in accordance with various embodiments.

FIG. 4 illustrates an example of a RoCN-aware MAC that is end to end between a UE and xNB for solution 2, in accordance with various embodiments.

FIGS. 12, 13, and 14 depict examples of procedures for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

In remote direct memory access (RDMA), for access and congestion control, Queue Pairs (QPs) are defined end to end to exchange data within allocated local and remote memories with keys such as local, remote keys to indicate the right to access corresponding memories. For cellular network, the network memory either serving as computing resource or data storage resource need to be controlled by the cellular network. Thus, the memory and key allocation/exchange shall be managed by the cellular network.

To enable these scenarios, embodiments of this disclosure help provide solutions to enhance the congestion control mechanism for end-to-end RDMA support over RAN to dynamically offload workload and execute compute tasks at the network computing infrastructure with low latency and better computing scaling. For example, various embodiments herein include RoCN-aware MAC enhancements to support congestion control for RDMA over the RAN.

Previous systems may not address the congestion control for RoCN (RDMA over Cellular Network). Additionally, there are no previous solutions to address the congestion control for RoCN.

Some embodiments may include:

Network support for RDMA over Cellular Network transport

RoCN aware MAC sublayer enhancements including mapping of RoCN Queue Pair to logical channels RoCN aware MAC sublayer enhancements for congestion control RDMA is considered as a new transport option for computing offloading and data services in the cellular network. These computing and data access require computing and storage capability in large scale.

High-Level RAN Architecture

Figure 1:
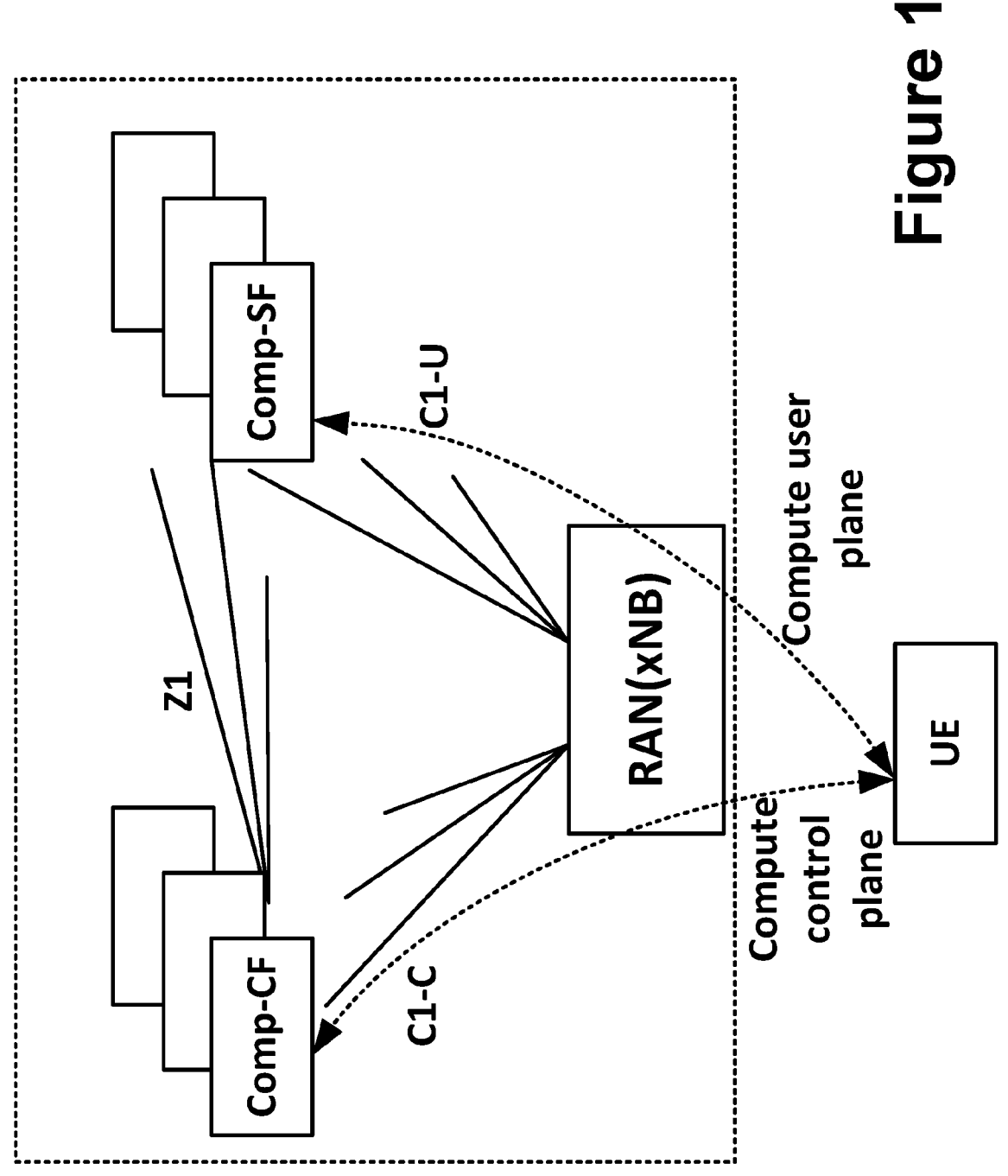
FIG. 1 illustrates an example of a RAN architecture with xNB and computing functions in accordance with various embodiments.

The architecture for RAN and its high-level relationship to computing functions is shown in FIG. 1 wherein it can be seen that a given xNB may have connectivity using interface C1 to Compute CF and Compute SF functions. The dotted box around these entities indicate that the compute functions may be collocated with the xNB.

As part of the dynamic distribution of compute intensive workload between UE and Network, a transport protocol design for offloading compute intensive workload over user plane and control plane was considered for collocated and non-collocated scenarios assuming architecture in FIG. 1.

RoCN Protocol

In some embodiments, an RDMA transport protocol may be defined to carry RDMA user plane traffic over a cellular network. Two solutions are proposed wherein the RDMA traffic is handled in 'compute as a service' manner (solution 1) with resources at Comp SF node beyond the RAN or in 'compute as a resource' manner (solution 2) with resources at the RAN/xNB itself. In user plane options for solution 2 (and potentially solution 1), RDMA-aware MAC that can be enhanced for congestion control is described at a high level. ANBR/ANBRQ [Access Network BitRate Recommendation/reQuest] logical messages that are defined in 5G are enhanced to support congestion control for RoCN as well.

Figure 2:
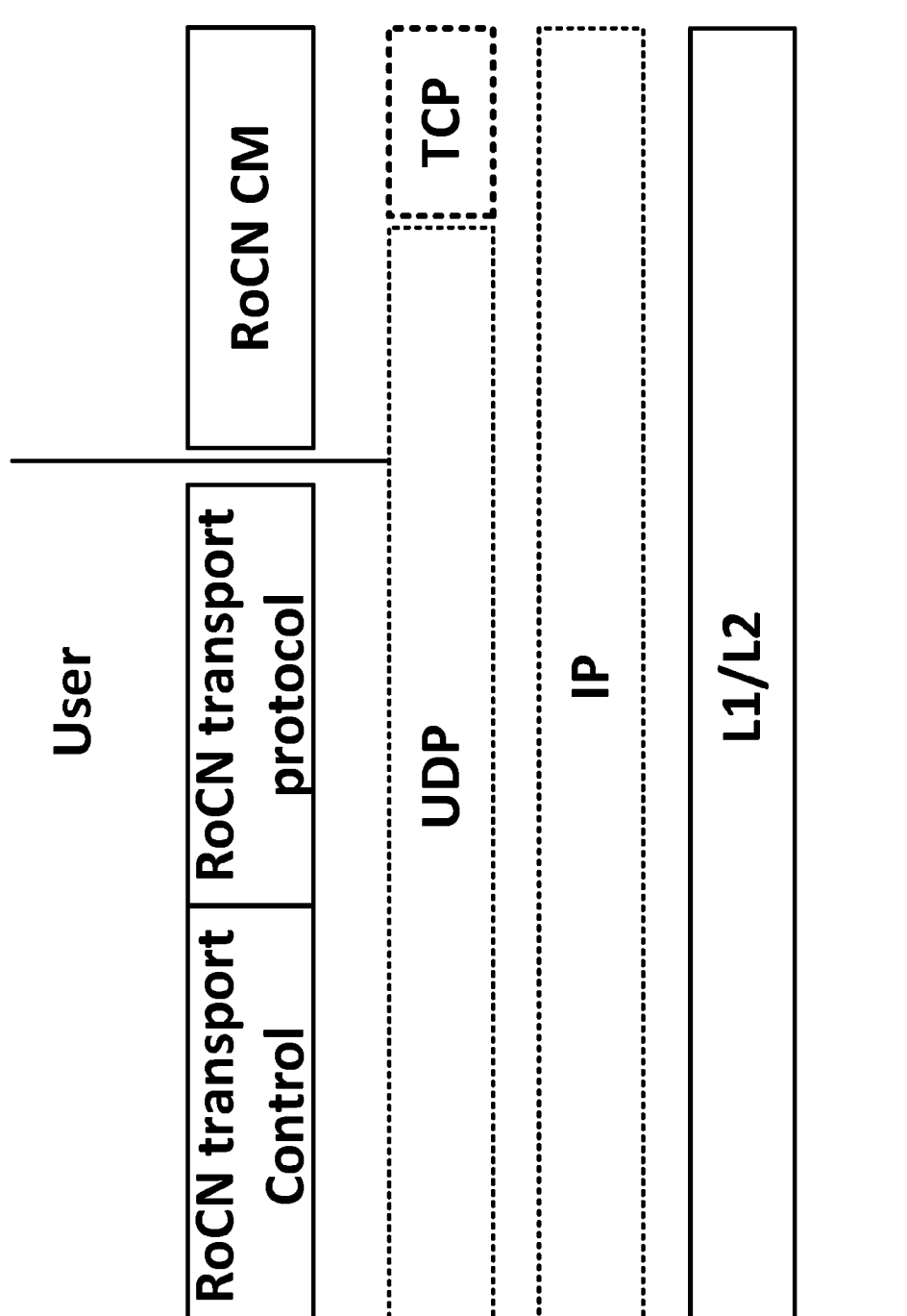
FIG. 2 illustrates an example of an exemplary protocol stack for RoCN Functions in accordance with various embodiments.

The high level RoCN protocol stack and the RoCN end-to-end protocol stack options defined for this scenario discussed previously with the two solutions are also illustrated in FIGS. 2-4. For example, FIG. 2 illustrates an example of an exemplary protocol stack for RoCN functions. FIG. 3 illustrates an example of a RoCN-aware MAC that is end to end between a UE and xNB for solution 1. FIG. 4 illustrates an example of an RoCN-aware MAC that is end to end between UE and xNB for solution 2. Various embodiments herein provide enhancements to MAC sublayer to support RoCN wherein the MAC is aware of RDMA (RoCN) traffic in some level to treat the traffic accordingly.

Embodiment (1) Transport Enhancements for RoCN

In some embodiments a framework for transporting RoCN through the xNB and the protocol stack options may be provided. In some embodiments an RRC (control plane protocol) may be utilized to set up a Queue Pair (QP) by providing RDMA requirements. In some embodiments, the UE's RoCN based PDU passes through the xNB and either terminates at the xNB (CU, DU) for resource accessibility or at RAN Compute Service Function over an interface.

For example, the RoCN connection manager at the UE sends RRC Setup request message which includes an RDMA or RoCN indicator to differentiate the incoming request from regular Compute request or even communication request if the same RRC protocol for communication is reutilized for setting up RoCN. Additionally, multiple transport options for sending Compute related requests to the xNB are discussed.

When a RoCN based compute task is thus generated, multiple QPs (Queue Pairs) with QP IDs may be created and the QPs refer to the RoCN based logical connection between two end points in the RoCN framework.

Some embodiments may help to ensure against packet loss in the RoCN mechanism to ensure highly reliable direct memory access which is comparable to RoCE and iWARP, etc.

Depending on whether the RAN compute is available as a service or a resource, the memory resource could be at the service function beyond the xNB or at the xNB respectively. Within the second case, the resource may be at the CU or DU in a split architecture.

Figure 5:
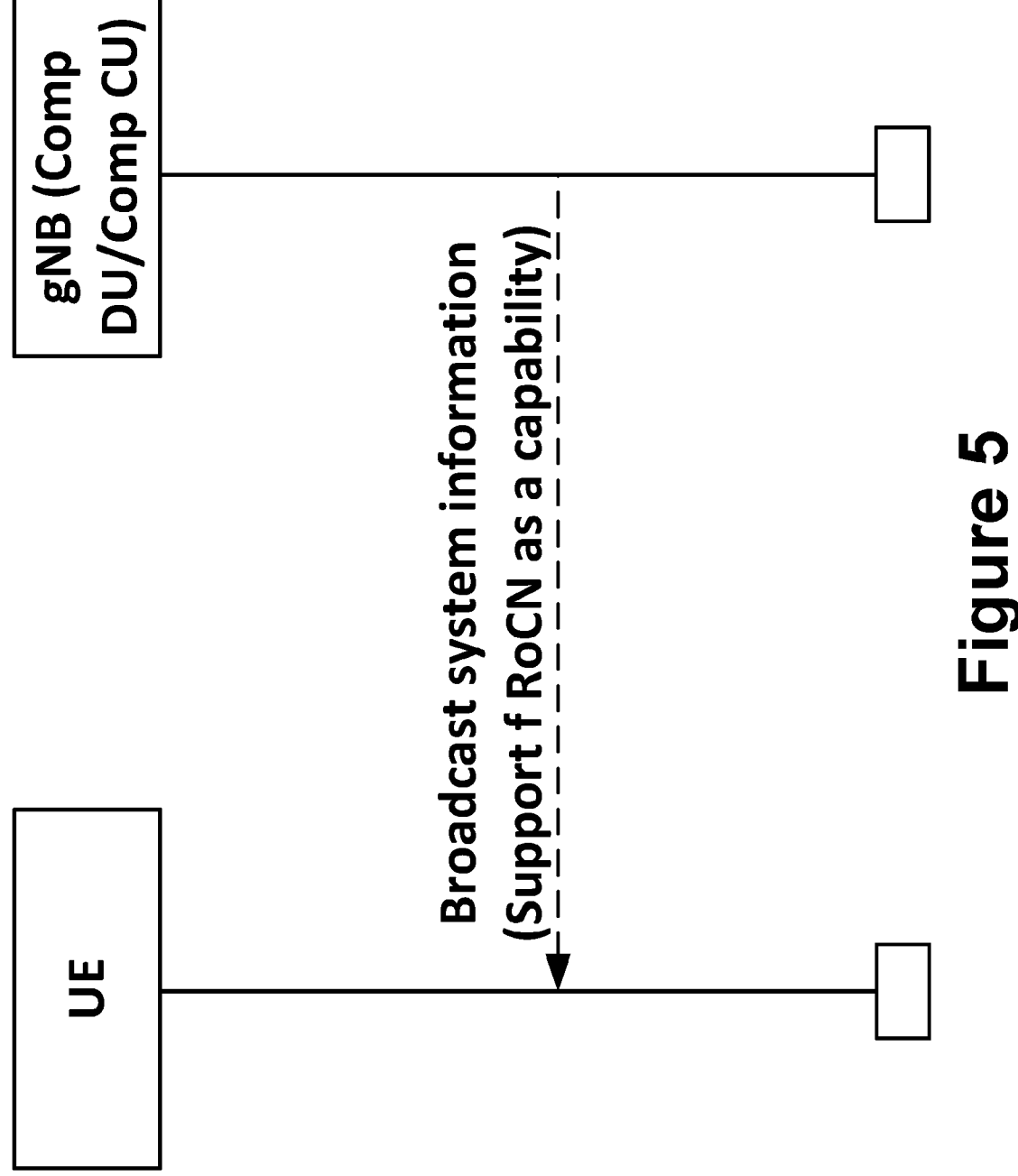
FIG. 5 illustrates an example of a broadcast of RoCN support in accordance with various embodiments.

In one example, the network (CU, DU) advertises the support for RoCN in the RNA or the cell and whether it is available as a service or locally at the RAN node. This broadcast information could include at least the type of resource, supported RDMA specific services (corresponding to specific QoS), RDMA accessible devices and their capabilities, memory size limit, etc as shown in FIG. 5. The UE supports RoCN as a UE capability or preconfigured in its subscription information.

In another example, a new dedicated RoCN traffic channel (similar to the dedicated traffic channel for communication) is established mapping onto the shared channel.

Embodiment (2) Mapping RDMA/RoCN Traffic to Logical Channels

To accomplish a given compute task, multiple QPs (logical connections) per task may be established. Assuming that this compute task is mapped to a specific compute radio bearer, we might need to differentiate the different QPs within the radio bearer. Logical channel-based treatment is the finest level of QoS treatment provided at the MAC layer wherein, the logical channel prioritization determines how the logical channels are allocated PHY resources for transmission.

Case 1 (n:1 Mapping);

In one example, when the QPs are established/set up and the RLC channel/bearer configuration is provided, configuration of the different QP traffic multiplexed onto this RLC radio channel/bearer is also provided. In this case, one RLC channel/bearer is mapped onto one logical channel which can carry SDUs from multiple QPs.

All the QPs within the logical channel undergo the same treatment in terms of logical channel configuration including priority, prioritized bit rate, bucket size duration, etc.

In case 1, all the QPs within the logical channel will map to the same priority (higher the priority number lower the priority) when the network configures the RLC channel. When there is congestion reported for a given QP within the LCH, all the QPs belonging to the LCH are adjusted for priority and bit rate.

The IE LogicalChannelConfig used to configure the logical channel parameters is modified as shown below:

```
-- ASN1START
-- TAG-LOGICALCHANNELCONFIG-START
LogicalChannelConfig ::=        SEQUENCE {
   ul-SpecificParameters      SEQUENCE {
      priority              INTEGER (1..16),
      prioritisedBitRate         ENUMERATED {kBps0, kBps8, kBps16, kBps32, kBps64,
kBps128, kBps256, kBps512,kBps1024, kBps2048, kBps4096, kBps8192, kBps16384,
kBps32768, kBps65536, infinity},
      bucketSizeDuration           ENUMERATED {ms5, ms10, ms20, ms50, ms100, ms150,
ms300, ms500, ms1000,spare7, spare6, spare5, spare4, spare3,spare2, spare1},
      .
      .
      .
      .
      .
      .
      .
      queuePairID-List              SEQUENCE (SIZE (1..maxAllowedQP-IDs) OF
QueuePair                  OPTIONAL,   -- Need R
      .
      .
QueuePair   ::=            SEQUENCE {
      qP              INTEGER (1..maxNrOfQPs)   OPTIONAL   -- Need N
      (other QP configuration as necessary)
}
      .
      .
      .
      .
   [[
   channelAccessPriority-r16            INTEGER
(1..4)                      OPTIONAL,   -- Need R
   bitRateMultiplier-r16            ENUMERATED {x40, x70, x100,
x200}                  OPTIONAL   -- Need R
   ]]
}
-- TAG-LOGICALCHANNELCONFIG-STOP
-- ASN1STOP
```

Case 2 (1:1 Mapping):

In another example, each QP may be mapped one to one to a logical channel such that one RLC channel/bearer only maps to one logical channel and thereby one QP. In this case, multiple logical channels with different logical channel identities (potentially utilizing some form of extended LCID) are utilized to provide 1:1 mapping. In this scenario, it tremendously increases the signalling overhead, but provides a finer granularity in that the network (xNB) can control the specific QP's priority and bit rate by reconfiguring the corresponding logical channel belonging to that QP.

```
-- ASN1START
-- TAG-LOGICALCHANNELCONFIG-START
LogicalChannelConfig ::=        SEQUENCE {
   ul-SpecificParameters      SEQUENCE {
      priority              INTEGER (1..16),
      prioritisedBitRate         ENUMERATED {kBps0, kBps8, kBps16, KBps32, kBps64,
kBps128, KBps256, kBps512,kBps1024, kBps2048, kBps4096, kBps8192, kBps16384,
KBps32768, kBps65536, infinity},
      bucketSizeDuration           ENUMERATED {ms5, ms10, ms20, ms50, ms100, ms150,
ms300, ms500, ms1000,spare7, spare6, spare5, spare4, spare3, spare2, spare1},
      .
      .
      .
      .
      queuePairID              INTEGER (0..maxQP-ID            OPTIONAL,   -- Need R
      .
      .
      .
   [[
   channelAccessPriority-r16            INTEGER
(1..4)                      OPTIONAL,   -- Need R
   bitRateMultiplier-r16            ENUMERATED {x40, x70, x100,
x200}                  OPTIONAL   -- Need R
   ]]
}
-- TAG-LOGICALCHANNELCONFIG-STOP
-- ASN1STOP
```

In an extended example, the mapping of QP to logical channel and its corresponding priority are dynamically controlled depending on the need and support of congestion control by the UE and the network as discussed below in Embodiment (3).

Embodiment 3) RoCN-Aware MAC-Based Congestion Control

In some embodiments, logical messages that are defined in 5G may be enhanced to support congestion control for RoCN as well. These logical messages map to a MAC control element in the MAC sublayer (e.g. Recommended bit rate MAC CE). This MAC control element is used by the network to inform the UE of physical layer bit rate it recommends for the corresponding logical channel. The averaging window of default value of 2000 ms is used. The network uses this MAC CE to provide the bit rate and specific direction to the UE. At the same time, the UE may trigger a recommended bit rate query to ask the network about this information.

For the RoCN-aware MAC CE based congestion control, the existing MAC CE can be modified. In one example, provision of the specific QP ID for which the rate is to be adjusted to prevent congestion (the LCID based recommended bit rate is already supported by specification). This case applies to both scenario 1 in Embodiment (2) wherein multiple QPs may be mapped onto the same logical channel whereas in scenario 2 for 1:1 mapping LCID is sufficient.

Upon reception of this MAC CE, the UE informs the upper layer of the QP ID for which the rate is to be adjusted.

In an extended example, the UE may query with the MAC CE containing the QP ID (in addition to the LCID), for the recommended bit rate.

Figure 6:
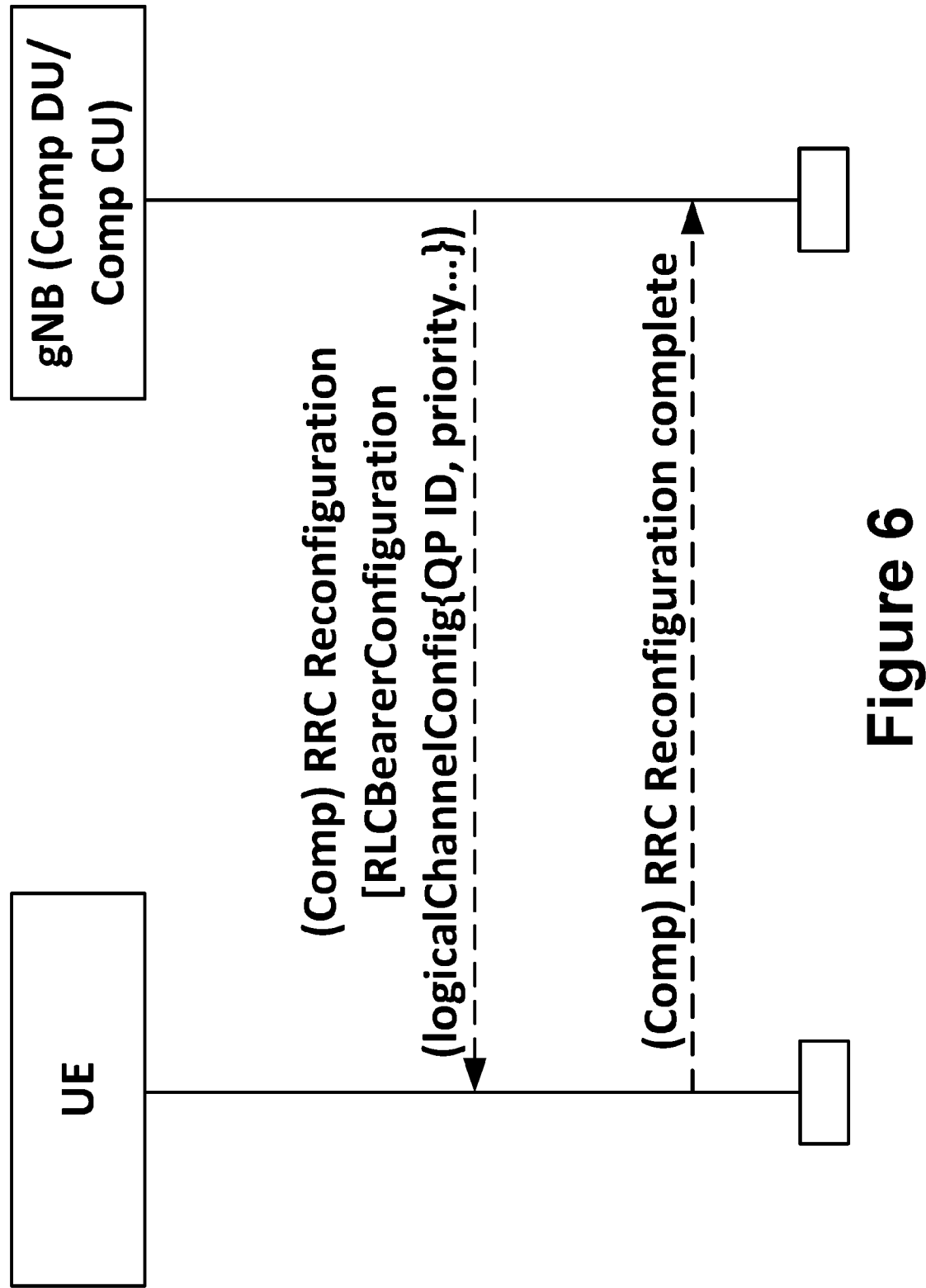
FIG. 6 illustrates an example of RRC Reconfiguration of a priority for QP in accordance with various embodiments.

In another example, based on information received about the congestion status (either at the xNB or from the RAN Compute Service Function), the network (xNB) may also adjust the priority of the logical channel belonging to the QP ID indicated in the congestion status as shown in FIG. 6. At the same time, it could initiate the recommended bit rate MAC CE at the QP ID level.

Figure 7:
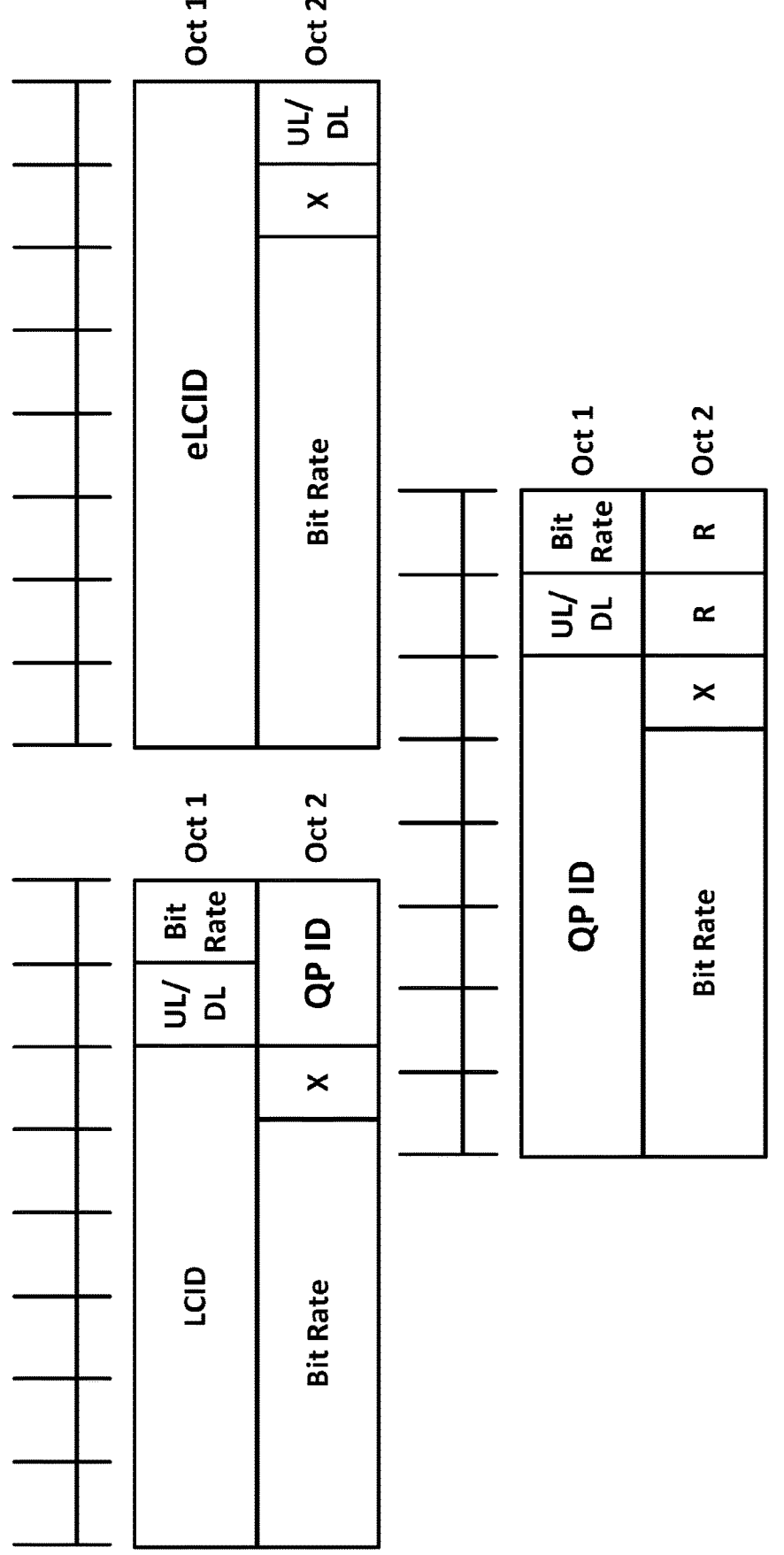
FIG. 7 illustrates an example of a recommended bit rate for RoCN sample MAC subheaders in accordance with various embodiments.

In one example, the Recommended bit rate for RoCN and Recommended bit rate query for RoCN MAC CE is identified by a MAC subheader with LCID and QP ID or eLCID or simply QP ID where there is 1:1 mapping, as shown in FIG. 7. As illustrated in FIG. 7:

QP ID: This field indicates the identity of the Queue Pair for which the recommended bit rate or the recommended bit rate query is applicable. The length of the field is variable (2 bits or 6 bits). In one example, the reserved bits are used for QP ID indication.

The other fields such as the LCID, eLCID, UL/DL, Bit Rate, X are as defined in specification TS 38.321, v. 16.5.0, 2021 Jul. 7, also paraphrased below for reference.

LCID: This field indicates the identity of the logical channel for which the recommended bit rate or the recommended bit rate query is applicable. The length of the field is 6 bits;

Uplink/Downlink (UL/DL): This field indicates whether the recommended bit rate or the recommended bit rate query applies to uplink or downlink. The length of the field is 1 bit. The UL/DL field set to 0 indicates downlink. The UL/DL field set to 1 indicates uplink;

Bit Rate: This field indicates an index to Table 6.1.3.20-1 in TS 38.321. The length of the field is 6 bits. For bit rate recommendation the value indicates the recommended bit rate. For bit rate recommendation query the value indicates the desired bit rate;

X: Bit rate multiplier. For UEs supporting recommended bit rate multiplier, when bitRateMultiplier is configured for the logical channel indicated by LCID field, X field set to "1" indicates the actual value of bit rate is the value corresponding to the index indicated by the Bit Rate field multiplied by bitRateMultiplier as specified in TS 38.331.

Embodiment (4) RoCN Congestion Control Between xNB and Compute SF

To support necessary QoS between the UE and the end point of Compute SF, hop-by-hop flow control is considered, and when there is congestion in the link between xNB and Compute SF that needs to be addressed. This could be due to:

a) Congestion at the xNB and necessary adjustments when Compute SF requests for resources to be assigned or informs of the upcoming computing results for UEs; xNB may indicate the congestion status if any.

b) Congestion at the Compute SF if multiple UEs access Compute resources simultaneously—many requests that need to be processed by the Compute SF and inform xNB.

Since the supported QoS flows could belong ultra-low latency applications using RoCN, appropriate congestion mechanism has to be in place.

Figure 8:
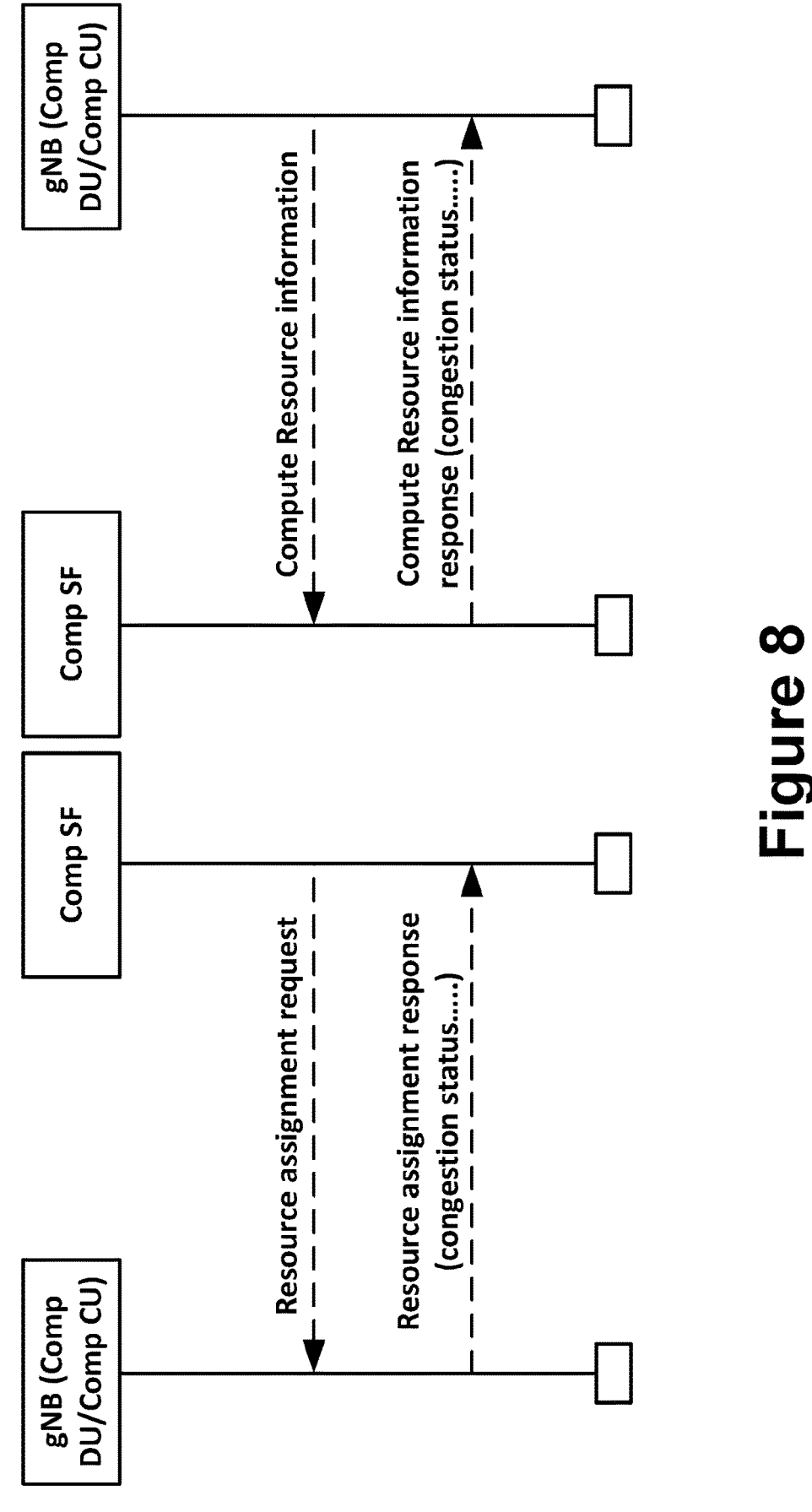
FIG. 8 illustrates an example of congestion status and resource information sharing between an xNb and Comp SF in accordance with various embodiments.

As showcased in FIG. 8, for a) we could have a resource assignment request message from Compute SF as shown in FIG. 8. The xNB may respond with some or all of the following information for a given data flow of the computing task:

Congestion status (on or off or certain percentage).

Data rate that can be supported (provided as a total amount or per UE in bits/sec or packets/sec or per compute task in tasks/sec)=>this indicates the total amount of data that the node can handle over a given window of time from the specific function. If it is per UE, then the UE ID has to be provided and if per compute task limit is set, then the corresponding task ID and/or session ID is to be provided.

Repetition period for how many times the data rate allocation can be repeated without further signaling exchange.

Validity period if any.

Interval indicating how many packets can be transmitted within a time interval

QoS or QFIs or priorities that can be served in the time period.

Necessary IDs (for example, of the UE, service, QoS flows, tasks).

To support b), similarly, the xNB could send a pre-assignment request message suggesting the amount of data to be expected potentially based on the BSR received corresponding to data allocation (assuming that the xNB is aware of the Compute SF towards which the data is headed to). The Compute SF could respond with at least some or all of the following information for a given data flow of the computing task:

Congestion status (on or off or certain percentage)

Data rate that can be supported (provided as a total amount or per UE in bits/sec or packets/sec or per compute task in tasks/sec)=>this indicates the total amount of data that the node can handle over a given window of time from the specific function. If it is per UE, then the UE ID has to be provided and if per compute task limit is set, then the corresponding task ID and/or session ID is to be provided.

Whether the required resources will be met or the amount of available resources

Validity period if any

Confidence % for satisfying a given QoS or QFI.

Necessary IDs (for example, of the UE, service, QoS flows, tasks)

It is to be noted that some of this information in both cases although not limiting, may not be applicable in certain scenarios.

Upon receiving the supported capacity or data rate information and other related assistance-like information, the xNB or the compute function can adjust or throttle the request or response messages.

Systems and Implementations

Figure 9:
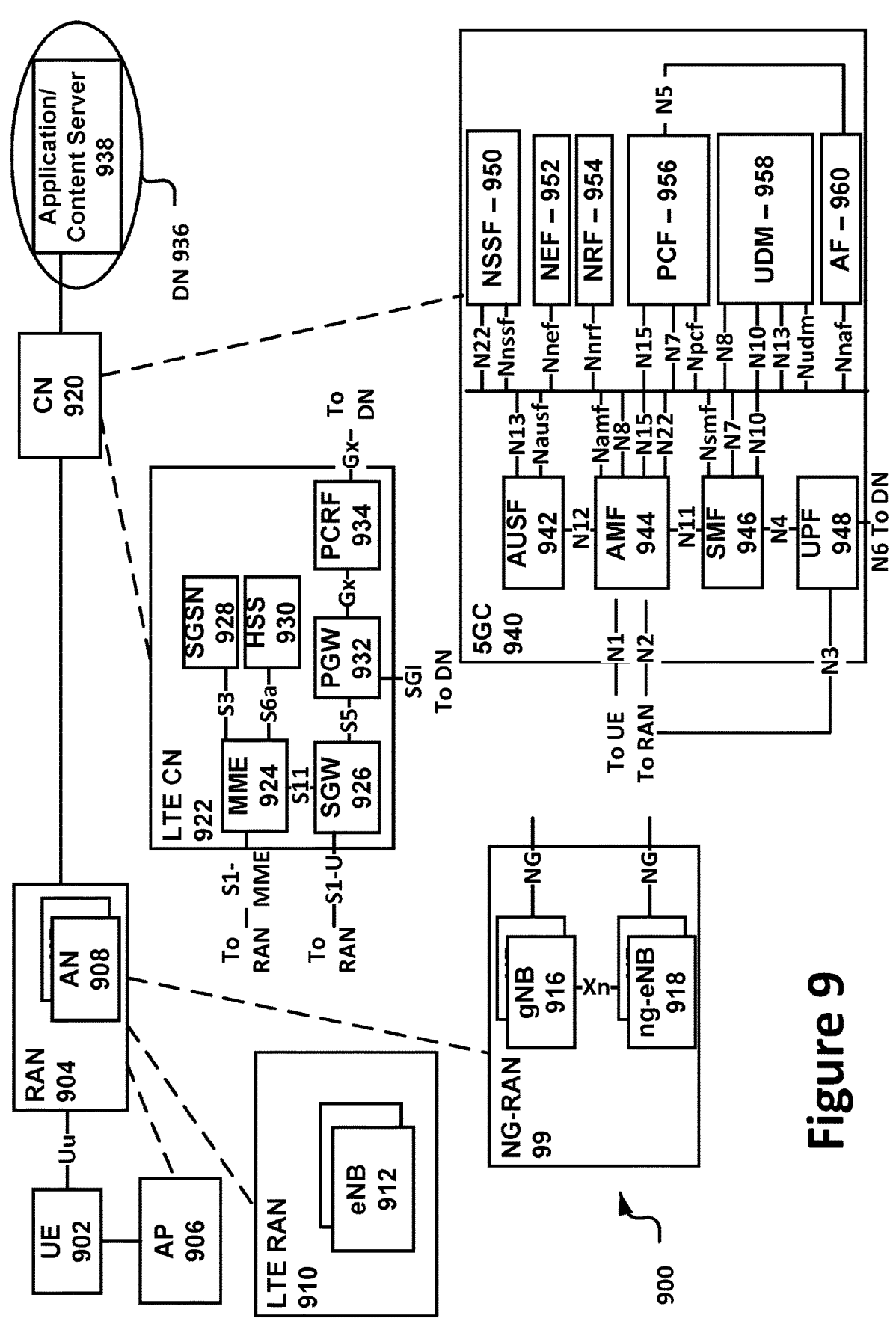
FIG. 9 schematically illustrates a wireless network in accordance with various embodiments.
Figure 10:
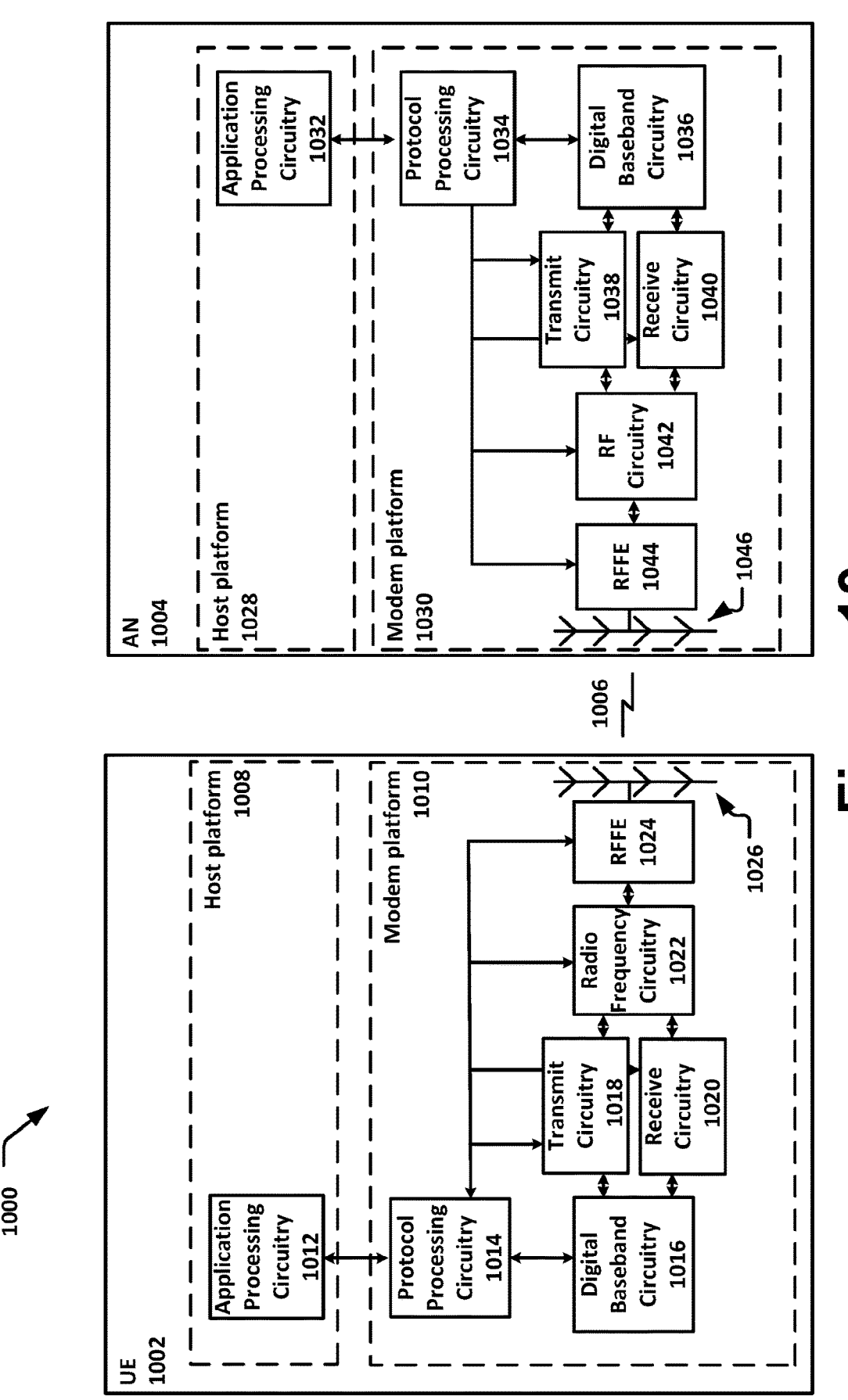
FIG. 10 schematically illustrates components of a wireless network in accordance with various embodiments.
Figure 11:
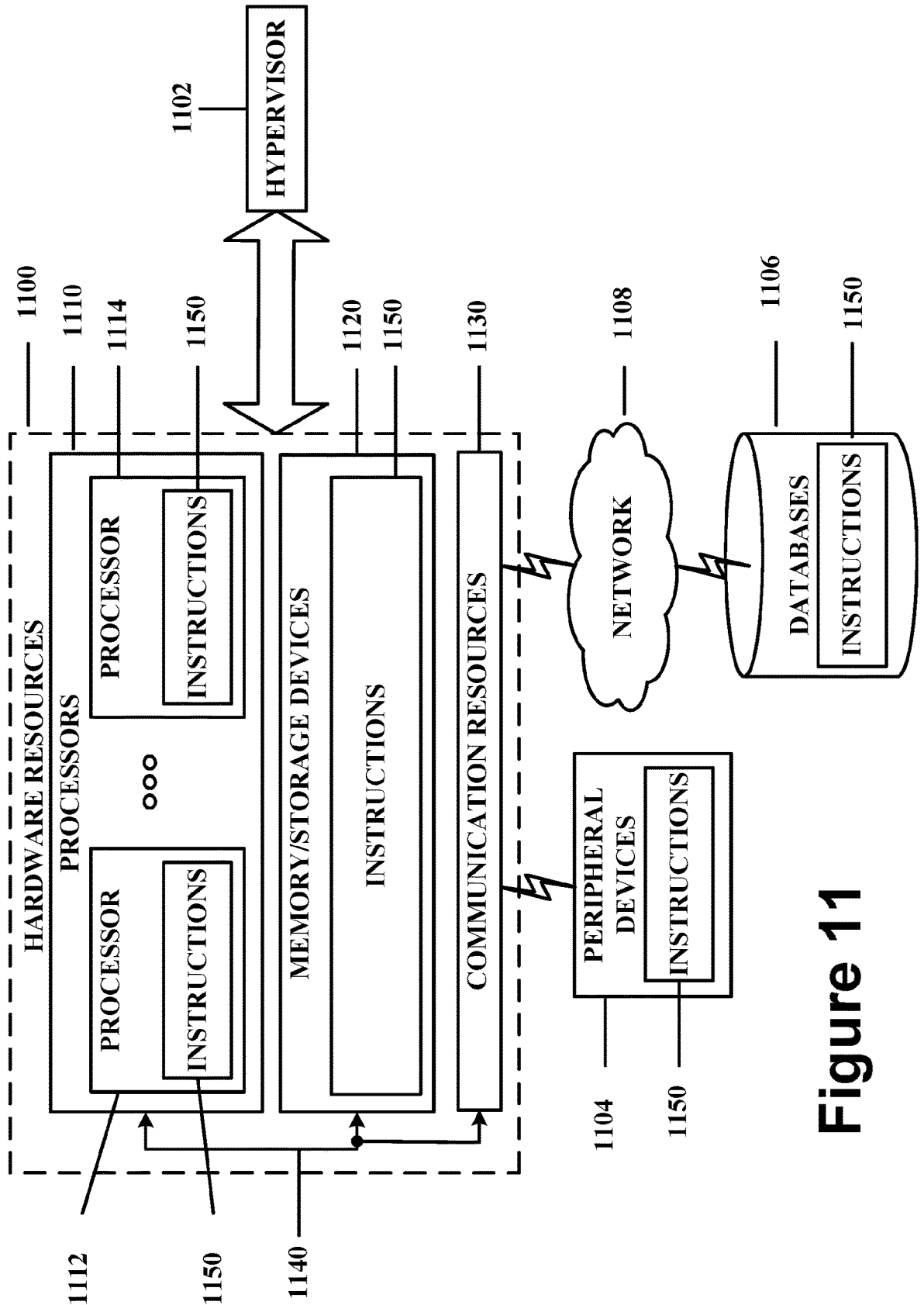
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 9-11 illustrate various systems, devices, and components that may implement aspects of disclosed embodiments.

FIG. 9 illustrates a network 900 in accordance with various embodiments. The network 900 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 900 may include a UE 902, which may include any mobile or non-mobile computing device designed to communicate with a RAN 904 via an over-the-air connection. The UE 902 may be communicatively coupled with the RAN 904 by a Uu interface. The UE 902 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 900 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 902 may additionally communicate with an AP 906 via an over-the-air connection. The AP 906 may manage a WLAN connection, which may serve to offload some/all network traffic from the RAN 904. The connection between the UE 902 and the AP 906 may be consistent with any IEEE 802.11 protocol, wherein the AP 906 could be a wireless fidelity (Wi-Fi®) router. In some embodiments, the UE 902, RAN 904, and AP 906 may utilize cellular-WLAN aggregation (for example, LWA/LWIP). Cellular-WLAN aggregation may involve the UE 902 being configured by the RAN 904 to utilize both cellular radio resources and WLAN resources.

The RAN 904 may include one or more access nodes, for example, AN 908. AN 908 may terminate air-interface protocols for the UE 902 by providing access stratum protocols including RRC, PDCP, RLC, MAC, and L1 protocols. In this manner, the AN 908 may enable data/voice connectivity between CN 920 and the UE 902. In some embodiments, the AN 908 may be implemented in a discrete device or as one or more software entities running on server computers as part of, for example, a virtual network, which may be referred to as a CRAN or virtual baseband unit pool. The AN 908 be referred to as a BS, gNB, RAN node, eNB, ng-eNB, NodeB, RSU, TRxP, TRP, etc. The AN 908 may be a macrocell base station or a low power base station for providing femtocells, picocells or other like cells having smaller coverage areas, smaller user capacity, or higher bandwidth compared to macrocells.

In embodiments in which the RAN 904 includes a plurality of ANs, they may be coupled with one another via an X2 interface (if the RAN 904 is an LTE RAN) or an Xn interface (if the RAN 904 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 904 may each manage one or more cells, cell groups, component carriers, etc. to provide the UE 902 with an air interface for network access. The UE 902 may be simultaneously connected with a plurality of cells provided by the same or different ANs of the RAN 904. For example, the UE 902 and RAN 904 may use carrier aggregation to allow the UE 902 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 904 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 902 or AN 908 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 904 may be an LTE RAN 910 with eNBs, for example, eNB 912. The LTE RAN 910 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 904 may be an NG-RAN 914 with gNBs, for example, gNB 916, or ng-eNBs, for example, ng-eNB 918. The gNB 916 may connect with 5G-enabled UEs using a 5G NR interface. The gNB 916 may connect with a 5G core through an NG interface, which may include an N2 interface or an N3 interface. The ng-eNB 918 may also connect with the 5G core through an NG interface, but may connect with a UE via an LTE air interface. The gNB 916 and the ng-eNB 918 may connect with each other over an Xn interface.

In some embodiments, the NG interface may be split into two parts, an NG user plane (NG-U) interface, which carries traffic data between the nodes of the NG-RAN 914 and a UPF 948 (e.g., N3 interface), and an NG control plane (NG-C) interface, which is a signaling interface between the nodes of the NG-RAN 914 and an AMF 944 (e.g., N2 interface).

The NG-RAN 914 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FRI bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 902 can be configured with multiple BWPs where each BWP configuration has a different SCS. When a BWP change is indicated to the UE 902, the SCS of the transmission is changed as well. Another use case example of BWP is related to power saving. In particular, multiple BWPs can be configured for the UE 902 with different amount of frequency resources (for example, PRBs) to support data transmission under different traffic loading scenarios. A BWP containing a smaller number of PRBs can be used for data transmission with small traffic load while allowing power saving at the UE 902 and in some cases at the gNB 916. A BWP containing a larger number of PRBs can be used for scenarios with higher traffic load.

The RAN 904 is communicatively coupled to CN 920 that includes network elements to provide various functions to support data and telecommunications services to customers/subscribers (for example, users of UE 902). The components of the CN 920 may be implemented in one physical node or separate physical nodes. In some embodiments, NFV may be utilized to virtualize any or all of the functions provided by the network elements of the CN 920 onto physical compute/storage resources in servers, switches, etc. A logical instantiation of the CN 920 may be referred to as a network slice, and a logical instantiation of a portion of the CN 920 may be referred to as a network sub-slice.

In some embodiments, the CN 920 may be an LTE CN 922, which may also be referred to as an EPC. The LTE CN 922 may include MME 924, SGW 926, SGSN 928, HSS 930, PGW 932, and PCRF 934 coupled with one another over interfaces (or "reference points") as shown. Functions of the elements of the LTE CN 922 may be briefly introduced as follows.

The MME 924 may implement mobility management functions to track a current location of the UE 902 to facilitate paging, bearer activation/deactivation, handovers, gateway selection, authentication, etc.

The SGW 926 may terminate an S1 interface toward the RAN and route data packets between the RAN and the LTE CN 922. The SGW 926 may be a local mobility anchor point for inter-RAN node handovers and also may provide an anchor for inter-3GPP mobility. Other responsibilities may include lawful intercept, charging, and some policy enforcement.

The SGSN 928 may track a location of the UE 902 and perform security functions and access control. In addition, the SGSN 928 may perform inter-EPC node signaling for mobility between different RAT networks; PDN and S-GW selection as specified by MME 924; MME selection for handovers; etc. The S3 reference point between the MME 924 and the SGSN 928 may enable user and bearer information exchange for inter-3GPP access network mobility in idle/active states.

The HSS 930 may include a database for network users, including subscription-related information to support the network entities' handling of communication sessions. The HSS 930 can provide support for routing/roaming, authentication, authorization, naming/addressing resolution, location dependencies, etc. An S6a reference point between the HSS 930 and the MME 924 may enable transfer of subscription and authentication data for authenticating/authorizing user access to the LTE CN 920.

The PGW 932 may terminate an SGi interface toward a data network (DN) 936 that may include an application/content server 938. The PGW 932 may route data packets between the LTE CN 922 and the data network 936. The PGW 932 may be coupled with the SGW 926 by an S5 reference point to facilitate user plane tunneling and tunnel management. The PGW 932 may further include a node for policy enforcement and charging data collection (for example, PCEF). Additionally, the SGi reference point between the PGW 932 and the data network 936 may be an operator external public, a private PDN, or an intra-operator packet data network, for example, for provision of IMS services. The PGW 932 may be coupled with a PCRF 934 via a Gx reference point.

The PCRF 934 is the policy and charging control element of the LTE CN 922. The PCRF 934 may be communicatively coupled to the app/content server 938 to determine appropriate Qos and charging parameters for service flows. The PCRF 932 may provision associated rules into a PCEF (via Gx reference point) with appropriate TFT and QCI.

In some embodiments, the CN 920 may be a 5GC 940. The 5GC 940 may include an AUSF 942, AMF 944, SMF 946, UPF 948, NSSF 950, NEF 952, NRF 954, PCF 956, UDM 958, and AF 960 coupled with one another over interfaces (or "reference points") as shown. Functions of the elements of the 5GC 940 may be briefly introduced as follows.

The AUSF 942 may store data for authentication of UE 902 and handle authentication-related functionality. The AUSF 942 may facilitate a common authentication framework for various access types. In addition to communicating with other elements of the 5GC 940 over reference points as shown, the AUSF 942 may exhibit an Nausf service-based interface.

The AMF 944 may allow other functions of the 5GC 940 to communicate with the UE 902 and the RAN 904 and to subscribe to notifications about mobility events with respect to the UE 902. The AMF 944 may be responsible for registration management (for example, for registering UE 902), connection management, reachability management, mobility management, lawful interception of AMF-related events, and access authentication and authorization. The AMF 944 may provide transport for SM messages between the UE 902 and the SMF 946, and act as a transparent proxy for routing SM messages. AMF 944 may also provide transport for SMS messages between UE 902 and an SMSF. AMF 944 may interact with the AUSF 942 and the UE 902 to perform various security anchor and context management functions. Furthermore. AMF 944 may be a termination point of a RAN CP interface, which may include or be an N2 reference point between the RAN 904 and the AMF 944; and the AMF 944 may be a termination point of NAS (N1) signaling, and perform NAS ciphering and integrity protection. AMF 944 may also support NAS signaling with the UE 902 over an N3 IWF interface.

The SMF 946 may be responsible for SM (for example, session establishment, tunnel management between UPF 948 and AN 908); UE IP address allocation and management (including optional authorization); selection and control of UP function; configuring traffic steering at UPF 948 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 944 over N2 to AN 908; and determining SSC mode of a session. SM may refer to management of a PDU session, and a PDU session or "session" may refer to a PDU connectivity service that provides or enables the exchange of PDUs between the UE 902 and the data network 936.

The UPF 948 may act as an anchor point for intra-RAT and inter-RAT mobility, an external PDU session point of interconnect to data network 936, and a branching point to support multi-homed PDU session. The UPF 948 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 948 may include an uplink classifier to support routing traffic flows to a data network.

The NSSF 950 may select a set of network slice instances serving the UE 902. The NSSF 950 may also determine allowed NSSAI and the mapping to the subscribed S-NS-SAIs, if needed. The NSSF 950 may also determine the AMF set to be used to serve the UE 902, or a list of candidate AMFs based on a suitable configuration and possibly by querying the NRF 954. The selection of a set of network slice instances for the UE 902 may be triggered by the AMF 944 with which the UE 902 is registered by interacting with the NSSF 950, which may lead to a change of AMF. The NSSF 950 may interact with the AMF 944 via an N22 reference point; and may communicate with another NSSF in a visited network via an N31 reference point (not shown). Additionally, the NSSF 950 may exhibit an Nnssf service-based interface.

The NEF 952 may securely expose services and capabilities provided by 3GPP network functions for third party, internal exposure/re-exposure, AFs (e.g., AF 960), edge computing or fog computing systems, etc. In such embodiments, the NEF 952 may authenticate, authorize, or throttle the AFs. NEF 952 may also translate information exchanged with the AF 960 and information exchanged with internal network functions. For example, the NEF 952 may translate between an AF-Service-Identifier and an internal 5GC information. NEF 952 may also receive information from other NFs based on exposed capabilities of other NFs. This information may be stored at the NEF 952 as structured data, or at a data storage NF using standardized interfaces. The stored information can then be re-exposed by the NEF 952 to other NFs and AFs, or used for other purposes such as analytics. Additionally, the NEF 952 may exhibit an Nnef service-based interface.

The NRF 954 may support service discovery functions, receive NF discovery requests from NF instances, and provide the information of the discovered NF instances to the NF instances. NRF 954 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 954 may exhibit the Nnrf service-based interface.

The PCF 956 may provide policy rules to control plane functions to enforce them, and may also support unified policy framework to govern network behavior. The PCF 956 may also implement a front end to access subscription information relevant for policy decisions in a UDR of the UDM 958. In addition to communicating with functions over reference points as shown, the PCF 956 exhibit an Npcf service-based interface.

The UDM 958 may handle subscription-related information to support the network entities' handling of communication sessions, and may store subscription data of UE 902. For example, subscription data may be communicated via an N8 reference point between the UDM 958 and the AMF 944. The UDM 958 may include two parts, an application front end and a UDR. The UDR may store subscription data and policy data for the UDM 958 and the PCF 956, and/or structured data for exposure and application data (including PFDs for application detection, application request information for multiple UEs 902) for the NEF 952. The Nudr service-based interface may be exhibited by the UDR 221 to allow the UDM 958, PCF 956, and NEF 952 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 958 may exhibit the Nudm service-based interface.

The AF 960 may provide application influence on traffic routing, provide access to NEF, and interact with the policy framework for policy control.

In some embodiments, the 5GC 940 may enable edge computing by selecting operator/3$^{rd}$ party services to be geographically close to a point that the UE 902 is attached to the network. This may reduce latency and load on the network. To provide edge-computing implementations, the 5GC 940 may select a UPF 948 close to the UE 902 and execute traffic steering from the UPF 948 to data network 936 via the N6 interface. This may be based on the UE subscription data, UE location, and information provided by the AF 960. In this way, the AF 960 may influence UPF (re)selection and traffic routing. Based on operator deployment, when AF 960 is considered to be a trusted entity, the network operator may permit AF 960 to interact directly with relevant NFs. Additionally, the AF 960 may exhibit an Naf service-based interface.

The data network 936 may represent various network operator services, Internet access, or third party services that may be provided by one or more servers including, for example, application/content server 938.

FIG. 10 schematically illustrates a wireless network 1000 in accordance with various embodiments. The wireless network 1000 may include a UE 1002 in wireless communication with an AN 1004. The UE 1002 and AN 1004 may be similar to, and substantially interchangeable with, like-named components described elsewhere herein.

The UE 1002 may be communicatively coupled with the AN 1004 via connection 1006. The connection 1006 is illustrated as an air interface to enable communicative coupling, and can be consistent with cellular communications protocols such as an LTE protocol or a 5G NR protocol operating at mmWave or sub-6 GHz frequencies.

The UE 1002 may include a host platform 1008 coupled with a modem platform 1010. The host platform 1008 may include application processing circuitry 1012, which may be coupled with protocol processing circuitry 1014 of the modem platform 1010. The application processing circuitry 1012 may run various applications for the UE 1002 that source/sink application data. The application processing circuitry 1012 may further implement one or more layer operations to transmit/receive application data to/from a data network. These layer operations may include transport (for example UDP) and Internet (for example, IP) operations The protocol processing circuitry 1014 may implement one or more of layer operations to facilitate transmission or reception of data over the connection 1006. The layer operations implemented by the protocol processing circuitry 1014 may include, for example, MAC, RLC, PDCP. RRC and NAS operations.

The modem platform 1010 may further include digital baseband circuitry 1016 that may implement one or more layer operations that are "below" layer operations performed by the protocol processing circuitry 1014 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1010 may further include transmit circuitry 1018, receive circuitry 1020, RF circuitry 1022, and RF front end (RFFE) 1024, which may include or connect to one or more antenna panels 1026. Briefly, the transmit circuitry 1018 may include a digital-to-analog converter, mixer, intermediate frequency (IF) components, etc.; the receive circuitry 1020 may include an analog-to-digital converter, mixer, IF components, etc.; the RF circuitry 1022 may include a low-noise amplifier, a power amplifier, power tracking components, etc.; RFFE 1024 may include filters (for example, surface/bulk acoustic wave filters), switches, antenna tuners, beamforming components (for example, phase-array antenna components), etc. The selection and arrangement of the components of the transmit circuitry 1018, receive circuitry 1020, RF circuitry 1022, RFFE 1024, and antenna panels 1026 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1014 may include one or more instances of control circuitry (not shown) to provide control functions for the transmit/receive components.

A UE reception may be established by and via the antenna panels 1026, RFFE 1024, RF circuitry 1022, receive circuitry 1020, digital baseband circuitry 1016, and protocol processing circuitry 1014. In some embodiments, the antenna panels 1026 may receive a transmission from the AN 1004 by receive-beamforming signals received by a plurality of antennas/antenna elements of the one or more antenna panels 1026.

A UE transmission may be established by and via the protocol processing circuitry 1014, digital baseband circuitry 1016, transmit circuitry 1018, RF circuitry 1022, RFFE 1024, and antenna panels 1026. In some embodiments, the transmit components of the UE 1004 may apply a spatial filter to the data to be transmitted to form a transmit beam emitted by the antenna elements of the antenna panels 1026.

Similar to the UE 1002, the AN 1004 may include a host platform 1028 coupled with a modem platform 1030. The host platform 1028 may include application processing circuitry 1032 coupled with protocol processing circuitry 1034 of the modem platform 1030. The modem platform may further include digital baseband circuitry 1036, transmit circuitry 1038, receive circuitry 1040, RF circuitry 1042, RFFE circuitry 1044, and antenna panels 1046. The components of the AN 1004 may be similar to and substantially interchangeable with like-named components of the UE 1002. In addition to performing data transmission/reception as described above, the components of the AN 1008 may perform various logical functions that include, for example, RNC functions such as radio bearer management, uplink and downlink dynamic radio resource management, and data packet scheduling.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140 or other interface circuitry. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processors 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface controllers, components, or other suitable devices to communicate with one or more peripheral devices 1104 or one or more databases 1106 or other network elements via a network 1108. For example, the communication resources 1130 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Example Procedures

In some embodiments, the electronic device(s), network(s), system(s), chip(s) or component(s), or portions or implementations thereof, of FIGS. 9-11, or some other figure herein, may be configured to perform one or more processes, techniques, or methods as described herein, or portions thereof.

One such process is depicted in FIG. 12, which may be performed by a gNB or portion thereof in some embodiments. In this example, process 1200 includes, at 1205, retrieving, from a memory, configuration information associated with offloading a computing task from a user equipment (UE) using remote direct memory access (RDMA) over cellular network (RoCN), wherein the configuration information includes an RDMA or RoCN indicator. The process further includes, at 1210, generating, based on the configuration information, a plurality of queue pairs (QPs), each respective QP having a respective QP identifier (ID).

The process further includes, at 1215, mapping RoCN traffic among a plurality of logical channels based on the plurality of QPs.

Another such process is depicted in FIG. 13. In this example, process 1300 includes, at 1305, receiving, from a user equipment (UE), a radio resource control (RRC) setup request that includes configuration information associated with offloading a computing task from the UE using remote direct memory access (RDMA) over cellular network (RoCN), wherein the configuration information includes an RDMA or RoCN indicator. The process further includes, at 1310, generating, based on the configuration information, a plurality of queue pairs (QPs), each respective QP having a respective QP identifier (ID). The process further includes, at 1315, mapping RoCN traffic among a plurality of logical channels based on the plurality of QPs.

Another such process is depicted in FIG. 14, which may be performed by a UE in some embodiments. In this example, process 1400 includes, at 1405, receiving, from a next-generation NodeB (gNB), system information to indicate support of RoCN as a capability by the gNB. The process further includes, at 1410, encoding, for transmission to the gNB, a radio resource control (RRC) setup request that includes configuration information associated with offloading a computing task from the UE using remote direct memory access (RDMA) over cellular network (RoCN), wherein the configuration information includes an RDMA or RoCN indicator.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method in which a UE has a compute task to be offloaded to the RAN (e.g. gNB/xNB with compute support) using RoCN as transport with separate functions such as RAN Compute CF (for control) and RAN Compute SF (service) to support the computation request and for the network to respond with corresponding computing response.

Example 2 may include a RAN node supporting RoCN to the UE of claim 1 with the:

Establishment of Queue Pairs to support compute request
Configuration of RLC channel corresponding to Queue pairs Example 3 may include the method of example 2 or some other example herein, wherein the RAN advertises support for RoCN in the RNA or just the specific cell using broadcast signaling.

Example 4 may include the method of example 2 or some other example herein, wherein one RLC channel with a given priority/bit rate/QoS profile is mapped onto a compute radio bearer carrying multiple QPs.

Example 5 may include an extended example of example 3,

Example 6 may include the method of example 2 or some other example herein, wherein one RLC channel with a given priority/bit rate/QoS profile is mapped onto one QP.

Example 7 may include the method of examples 1 and 2 or some other example herein, wherein the RAN node adjusts the priority of the logical channel or the QP ID based on congestion status using reconfiguration message.

Example 8 may include the method of example 1 or some other example herein, wherein the UE can send a RoCN MAC CE to query the recommended bit rate for the logical channel or QP ID and receives the recommended bit rate from the RAN node.

Example 9 may include the method of example 2 or some other example herein, wherein the compute SF function can request for preparation of resources at the RAN node based on expected compute results. In an extended example, the compute SF and RAN node can exchange congestion status information and supported or available data rates within a defined time period to transmit/receive compute data i.e. compute request/response messages correspondingly.

Example X1 includes an apparatus comprising:
  memory to store configuration information associated with offloading a computing task from a user equipment (UE) using remote direct memory access (RDMA) over cellular network (RoCN): and
  processing circuitry, coupled with the memory, to:
    retrieve the configuration information from the memory, wherein the configuration information includes an RDMA or RoCN indicator;
    generate, based on the configuration information, a plurality of queue pairs (QPs), each respective QP having a respective QP identifier (ID); and
    map RoCN traffic among a plurality of logical channels based on the plurality of QPs.

Example X2 includes the apparatus of example X1 or some other example herein, wherein the RoCN traffic is mapped among the plurality of logical channels based on a logical channel prioritization.

Example X3 includes the apparatus of example X2 or some other example herein, wherein mapping the RoCN traffic includes mapping one radio link control (RLC) channel or bearer onto one logical channel to carry service data units (SDUs) from multiple QPs.

Example X4 includes the apparatus of example X2 or some other example herein, wherein mapping the RoCN traffic includes mapping one RLC channel or bearer to one logical channel associated with one QP.

Example X5 includes the apparatus of example X1 or some other example herein, wherein the processing circuitry is further to encode a message for transmission to the UE that includes a medium access control (MAC) control element (CE) comprising an indication of a physical layer bit rate for a logical channel.

Example X6 includes the apparatus of example X5 or some other example herein, wherein the MAC CE further includes an indication of a QP ID or a priority of a logical channel associated with a QP ID.

Example X7 includes the apparatus of example X1 or some other example herein, wherein the processing circuitry is further to:
  receive, from a computing service function (Comp SF) a resource assignment request; and
  send, to the Comp SF, a resource assignment response that includes a congestion status indicator.

Example X8 includes the apparatus of example X7 or some other example herein, wherein the resource assignment response further includes one or more of: a supported data rate, a repetition period associated with a number of times a data rate allocation can be repeated without a further signaling exchange, a validity period, an indication of a number of packets that can be transmitted within a time interval, a quality of service (QoS) indicator or QoS flow identifier (QFI) or priority that can be served within a time period, a UE identifier, a service identifier, or a task identifier.

Example X9 includes the apparatus of any of examples X1-X8 or some other example herein, wherein the apparatus includes a next-generation NodeB (gNB) or portion thereof.

Example X10 includes the apparatus of any of examples X1-X8 or some other example herein, wherein the processing circuitry is further to broadcast, to the UE, system information to indicate support of RoCN as a capability.

Example X11 includes one or more computer-readable media storing instructions that, when executed by one or more processors, cause a next-generation NodeB (gNB) to:
  receive, from a user equipment (UE), a radio resource control (RRC) setup request that includes configuration information associated with offloading a computing task from the UE using remote direct memory access (RDMA) over cellular network (RoCN), wherein the configuration information includes an RDMA or RoCN indicator;
  generate, based on the configuration information, a plurality of queue pairs (QPs), each respective QP having a respective QP identifier (ID); and
  map RoCN traffic among a plurality of logical channels based on the plurality of QPs.

Example X12 includes the one or more computer-readable media of example X11 or some other example herein, wherein the RoCN traffic is mapped among the plurality of logical channels based on a logical channel prioritization.

Example X13 includes the one or more computer-readable media of example X12 or some other example herein, wherein mapping the RoCN traffic includes mapping one radio link control (RLC) channel or bearer onto one logical channel to carry service data units (SDUs) from multiple QPs.

Example X14 includes the one or more computer-readable media of example X12 or some other example herein, wherein mapping the RoCN traffic includes mapping one RLC channel or bearer to one logical channel associated with one QP.

Example X15 includes the one or more computer-readable media of example X11 or some other example herein, wherein the media further stores instructions to encode a message for transmission to the UE that includes a medium access control (MAC) control element (CE) comprising an indication of a physical layer bit rate for a logical channel.

Example X16 includes the one or more computer-readable media of example X15 or some other example herein, wherein the MAC CE further includes an indication of a QP ID or a priority of a logical channel associated with a QP ID.

Example X17 includes the one or more computer-readable media of example X11 or some other example herein, wherein the processing circuitry is further to:
  receive, from a computing service function (Comp SF) a resource assignment request; and
  send, to the Comp SF, a resource assignment response that includes a congestion status indicator.

Example X18 includes the one or more computer-readable media of example X17 or some other example herein, wherein the resource assignment response further includes one or more of: a supported data rate, a repetition period associated with a number of times a data rate allocation can be repeated without a further signaling exchange, a validity period, an indication of a number of packets that can be transmitted within a time interval, a quality of service (Qos) indicator or QoS flow identifier (QFI) or priority that can be served within a time period, a UE identifier, a service identifier, or a task identifier.

Example X19 includes the one or more computer-readable media of any of examples X11-X18 or some other example herein, wherein the media further stores instructions to broadcast, to the UE, system information to indicate support of RoCN as a capability.

Example X20 includes one or more computer-readable media storing instructions that, when executed by one or more processors, cause a user equipment (UE) to:

receive, from a next-generation NodeB (gNB), system information to indicate support of RoCN as a capability by the gNB; and encode, for transmission to the gNB, a radio resource control (RRC) setup request that includes configuration information associated with offloading a computing task from the UE using remote direct memory access (RDMA) over cellular network (RoCN), wherein the configuration information includes an RDMA or RoCN indicator.

Example X21 includes the one or more computer-readable media of example X20 or some other example herein, wherein the media further stores instructions to receive a message from the gNB that includes a medium access control (MAC) control element (CE) comprising an indication of a physical layer bit rate for a logical channel.

Example X22 includes the one or more computer-readable media of example X21 or some other example herein, wherein the MAC CE further includes an indication of a QP ID or a priority of a logical channel associated with a QP ID.

Example X23 includes the one or more computer-readable media of example X21 or some other example herein, wherein the media further stores instructions to:

perform a reconfiguration process based on the MAC CE; and encode a reconfiguration complete message for transmission to the gNB.

Example Z01 may include an apparatus comprising means to perform one or more elements of a method described in or related to any of examples 1-X23, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X23, or any other method or process described herein.

Example Z03 may include an apparatus comprising logic, modules, or circuitry to perform one or more elements of a method described in or related to any of examples 1-X23, or any other method or process described herein.

Example Z04 may include a method, technique, or process as described in or related to any of examples 1-X23, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X23, or portions thereof.

Example Z06 may include a signal as described in or related to any of examples 1-X23, or portions or parts thereof.

Example Z07 may include a datagram, packet, frame, segment, protocol data unit (PDU), or message as described in or related to any of examples 1-X23, or portions or parts thereof, or otherwise described in the present disclosure.

Example Z08 may include a signal encoded with data as described in or related to any of examples 1-X23, or portions or parts thereof, or otherwise described in the present disclosure.

Example Z09 may include a signal encoded with a datagram, packet, frame, segment, protocol data unit (PDU), or message as described in or related to any of examples 1-X23, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X23, or portions thereof.

Example Z11 may include a computer program comprising instructions, wherein execution of the program by a processing element is to cause the processing element to carry out the method, techniques, or process as described in or related to any of examples 1-X23, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| 3GPP | Third Generation Partnership Project |
| --- | --- |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |

-continued

| | |
|---|---|
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |

-continued

| | |
|---|---|
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |

| | |
|---|---|
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |

| | |
|---|---|
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |

-continued

| | |
|---|---|
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTCmassive | MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |

-continued

| | |
|---|---|
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |

-continued

| | |
|---|---|
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time Rx Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH Block SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |

-continued

| | |
|---|---|
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |

-continued

| | |
|---|---|
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:
memory to store configuration information associated with offloading a computing task from a user equipment (UE) using remote direct memory access (RDMA) over cellular network (RoCN); and
processing circuitry, coupled with the memory, to:
retrieve the configuration information from the memory, wherein the configuration information includes an RDMA or RoCN indicator;

generate, based on the configuration information, a plurality of queue pairs (QPs), each respective QP having a respective QP identifier (ID); and
map RoCN traffic among a plurality of logical channels based on the plurality of QPs, wherein the mapping is based on the QP ID and a logical channel prioritization associated with the QP ID.

2. The apparatus of claim 1, wherein the RoCN traffic is mapped among the plurality of logical channels based on a logical channel prioritization.

3. The apparatus of claim 2, wherein to map the RoCN traffic includes to map one radio link control (RLC) channel or bearer onto one logical channel to carry service data units (SDUs) from multiple QPs.

4. The apparatus of claim 2, wherein to map the RoCN traffic includes to map one RLC channel or bearer to one logical channel associated with one QP.

5. The apparatus of claim 1, wherein the processing circuitry is further to encode a message for transmission to the UE that includes a medium access control (MAC) control element (CE) comprising an indication of a physical layer bit rate for a logical channel.

6. The apparatus of claim 5, wherein the MAC CE further includes an indication of a QP ID or a priority of a logical channel associated with a QP ID.

7. The apparatus of claim 1, wherein the processing circuitry is further to:
receive, from a computing service function (Comp SF) a resource assignment request; and
send, to the Comp SF, a resource assignment response that includes a congestion status indicator.

8. The apparatus of claim 7, wherein the resource assignment response further includes one or more of: a supported data rate, a repetition period associated with a number of times a data rate allocation can be repeated without a further signaling exchange, a validity period, an indication of a number of packets that can be transmitted within a time interval, a quality of service (QoS) indicator or QoS flow identifier (QFI) or priority that can be served within a time period, a UE identifier, a service identifier, or a task identifier.

9. The apparatus of claim 1, wherein the processing circuitry is further to broadcast, to the UE, system information to indicate support of RoCN as a capability.

10. One or more non-transitory computer-readable media storing instructions that, when executed by one or more processors, cause a next-generation NodeB (gNB) to:
receive, from a user equipment (UE), a radio resource control (RRC) setup request that includes configuration information associated with offloading a computing task from the UE using remote direct memory access (RDMA) over cellular network (RoCN), wherein the configuration information includes an RDMA or RoCN indicator;
generate, based on the configuration information, a plurality of queue pairs (QPs), each respective QP having a respective QP identifier (ID); and
map RoCN traffic among a plurality of logical channels based on the plurality of QPs, wherein the mapping is based on the QP ID and a logical channel prioritization associated with the QP ID.

11. The one or more non-transitory computer-readable media of claim 10, wherein the RoCN traffic is mapped among the plurality of logical channels based on a logical channel prioritization.

12. The one or more non-transitory computer-readable media of claim 11, wherein to map the RoCN traffic includes to:

map one radio link control (RLC) channel or bearer onto one logical channel to carry service data units (SDUs) from multiple QPs; or map one RLC channel or bearer to one logical channel associated with one QP.

13. The one or more non-transitory computer-readable media of claim 10, wherein the media further stores instructions that when executed cause the gNB to encode a message for transmission to the UE that includes a medium access control (MAC) control element (CE) comprising an indication of a physical layer bit rate for a logical channel.

14. The one or more non-transitory computer-readable media of claim 13, wherein the MAC CE further includes an indication of a QP ID or a priority of a logical channel associated with a QP ID.

15. The one or more non-transitory computer-readable media of claim 10, wherein the media further stores instructions that when executed cause the gNB to:

receive, from a computing service function (Comp SF) a resource assignment request; and send, to the Comp SF, a resource assignment response that includes a congestion status indicator.

16. The one or more non-transitory computer-readable media of claim 15, wherein the resource assignment response further includes one or more of:

a supported data rate, a repetition period associated with a number of times a data rate allocation can be repeated without a further signaling exchange, a validity period, an indication of a number of packets that can be transmitted within a time interval, a quality of service (QoS) indicator or QoS flow identifier (QFI) or priority that can be served within a time period, a UE identifier, a service identifier, or a task identifier.

\* \* \* \* \*